United States Patent [19]
Imura et al.

[11] Patent Number: 5,845,157
[45] Date of Patent: Dec. 1, 1998

[54] ANTI-VIBRATION DEVICE FOR AN OPTICAL IMAGING SYSTEM HAVING IMPROVED DRIVE FORCE

[75] Inventors: Yoshio Imura, Kawasaki; Yoshihisa Kitagawa, Kashiwa, both of Japan

[73] Assignee: Nikon Corporation, Tokyo, Japan

[21] Appl. No.: 735,746

[22] Filed: Oct. 23, 1996

Related U.S. Application Data

[63] Continuation of Ser. No. 273,853, Jul. 12, 1994, abandoned.

[30] Foreign Application Priority Data

Jul. 12, 1993 [JP] Japan ................................. 5-193845

[51] Int. Cl.⁶ .................................................. G03B 5/00
[52] U.S. Cl. ............................ 396/55; 348/208; 359/813
[58] Field of Search ........................ 396/52, 55; 348/208; 359/813, 814

[56] References Cited

U.S. PATENT DOCUMENTS

| | | |
|---|---|---|
| 4,864,339 | 9/1989 | Gross et al. . |
| 4,970,540 | 11/1990 | Vasey et al. . |
| 5,172,276 | 12/1992 | Ueyama et al. . |
| 5,305,040 | 4/1994 | Enomoto . |

*Primary Examiner*—Howard B. Blankenship

[57] ABSTRACT

An anti-vibration device for an optical imaging system which cancels or mitigates forces arising when the anti-vibration device is driven in a first or second direction. The anti-vibration device is held in a lens frame which is driven in a first or second direction by a drive force generating device. The drive generating device includes first and second motors, the force of which is transmitted to the lens frame via respective transmission gear trains and drive shafts which move a movable member and thus move the lens frame. The position of action of the force on the lens frame due to the respective shafts is set to a position which divides the lens frame in a specified ratio, and the positions of action of the respective shafts are close to each other.

10 Claims, 7 Drawing Sheets

ANTI-VIBRATION DEVICE FOR AN OPTICAL IMAGING SYSTEM HAVING IMPROVED DRIVE FORCE

This application is a continuation of application Ser. No. 08/273,853, filed Jul. 12, 1994, now abandoned.

BACKGROUND OF THE INVENTION

1. Field of the Invention

The present invention relates to an anti-vibration device for preventing image deflection in an optical imaging system, such as a camera, which is caused by vibration from a hand tremor or other cause of vibration.

2. Description of the Related Art

Various camera functions have changed markedly in recent times in that many of these functions are automatically performed electronically. For example, exposure mechanisms, focusing mechanisms, and the like, have become automated to a high degree. However, attempts to electronically perform countermeasures against image deflection due to hand tremor and like causes of image deflection which tend to arise during hand-held photography have proven to be insufficient.

For example, cameras are known in the related art which prevent image deflection which arises due to jolting of the camera, and particularly due to shaking or tilting of the camera, with a vibration prevention device. The related art vibration prevention device detects shaking, tilting or jolting of the camera with a vibration detection means. An optical system of a photographic lens system ("main optical system") or a portion of the main optical system which serves as an anti-vibration optical system ("anti-vibration lens") is shifted in a direction orthogonal to the optical axis in accordance with the result of the detection by the vibration prevention device.

More particularly, a camera having the kind of anti-vibration function described above includes a movably supported anti-vibration lens comprising a portion of the main optical system. By moving the anti-vibration lens in a plane orthogonal to the optical axis of the main optical system and in a direction to absorb the vibration, blurring motion of the imaging position due to vibration is corrected, and image deflection is cancelled. In the above-described type of vibration prevention device, a drive mechanism used to shift the anti-vibration lens may be, for example, that disclosed in JP-A-3-110530 [Japanese Laid-Open Patent Publication 3-110530].

According to JP-A-3-110530, a lens frame for the anti-vibration lens is supported to enable movement in a plane orthogonal to the optical axis. A drive force from first and second drive force generating means is imparted on the x-axis side and y-axis side of the lens frame, respectively, using motors, gear trains, levers or screw shafts, steel balls and V-groove units. The drive force is transmitted as compressive force and tensile force movement using, for example, a rod member or drive shaft. The anti-vibration lens is thereby directly driven in the x-axis direction and the y-axis direction to obtain movement of the anti-vibration lens in the directed direction.

According to the above-described related art, the prevention of image deflection is achieved by application of a drive force on the anti-vibration lens from the first and second drive force generating means via first and second drive force transmission means, and further via first and second movement amount generating means to move the lens frame by suitably driving the lens frame in a first direction or a second direction. However, the following problems arise in the related art anti-vibration device.

Specifically, a coupling portion couples the first and second movement amount generating means to the lens frame to impart movement to the lens frame. During movement of the lens frame in one direction by the movement amount generating means, because of the portion which couples the movement amount generating means to the lens frame, it becomes necessary to guide the lens frame with a guide unit to move the lens frame along the direction of movement. Sliding friction occurs in the lens frame guide unit, and because of this sliding friction it becomes difficult to obtain the required movement of the lens frame accompanying the force from the movement amount generating means. Additionally, a moment operates on the lens frame such that the desired drive control of the lens frame cannot be performed.

It is unavoidable that frictional forces are generated in portions coupled to the transmission means which transmits the drive force from the drive means when driving the anti-vibration lens. However, forces operate accompanying the frictional force, and these accompanying forces confer a rotary moment with respect to the lens frame. Accordingly, in the related art anti-vibration device problems arise as a result of these accompanying forces. Specifically, the anti-vibration drive is not smooth and it is impossible to accurately transmit the anti-vibration drive to the anti-vibration lens, correction errors occur easily, and the desired anti-vibration function is not achieved.

More specifically, in the related art devices the movement amount generation means for the anti-vibration lens is not on a line extending in the direction of frictional forces arising between guide portions due to the anti-vibration drive, and, therefore, it is desirable to adopt countermeasures to eradicate these problems.

Furthermore, the movement amount generation means which imparts movement to the lens frame is normally used in combination with an energizing means positioned opposite the lens frame in portion(s) facing the lens frame to confer the required amount of movement to the lens frame. Since the position of the energizing means is not on a line extending in the direction of the frictional forces in the guide portions, the effect of the rotary moment is large.

Moreover, when the above-described type of energizing means is used, while the lens frame is moved by the force from the movement amount generation means on one side, accompanying the movement of the lens frame there is a displacement of the coupling position of another energizing means, attached to a separate position of the lens frame. Because an alteration of the urging force accompanying the amount of displacement also operates as a moment on the lens frame, this force must also be considered.

What is needed is an anti-vibration device which takes the above-described conditions into account, and, using a simple, inexpensive structure, offsets or reduces the force generated during the driving of the anti-vibration lens which prevent smooth driving of the anti-vibration lens. Further, a device is needed which is able to more accurately transmit the force of a movement amount generating device for moving the anti-vibration optical system.

SUMMARY OF THE INVENTION

It is an object of the present invention to provide an anti-vibration device having a simple and inexpensive structure.

It is a further object of the present invention to provide an anti-vibration device wherein the thrust of a movement amount generating device to move an anti-vibration optical system is more accurately transmitted.

Objects and advantages of the invention will be set forth in part in the description which follows, and, in part, will be obvious from the description, or may be learned by practice of the invention.

Objects of the invention are obtained by providing an anti-vibration device for an optical imaging system having first and second drive force generating units to drive a lens frame supporting an anti-vibration optical system in first and second directions, respectively. First and second drive force transmission devices transfer the drive force of the respective drive force generating units to the lens frame, and first and second movement amount generating devices connected to the first and second drive force transmission devices cause the lens frame to move in the first or second direction. The first and second movement amount generating devices are respectively linked to the lens frame in a condition in which, while moving the lens frame in the first or second direction, the lens frame is guided so that it may be moved in either one of the first or second direction. Furthermore, the positions of the forces acting on the lens frame through the first and second movement amount generating devices are within the range of the link between the movement amount generating devices and the lens frame, and the positions of the forces are set such that the respective forces are provided close to the link between the other movement amount generating device and the lens frame.

The anti-vibration device in accordance with the present invention is equipped with first and second energizing devices which impart energy to the lens frame in the first and second directions, respectively. The positions of action of the force acting on the lens frame due to each movement amount generating device and the corresponding energizing devices are positions which offset the angular moment which acts on the lens frame as a result of loads in the first and second directions which are generated between the second or first movement amount generating devices and the link to the lens frame when the lens frame moves in the first or second direction, and as a result of the load in the first or second direction from the second or first generating devices, respectively.

Furthermore, the anti-vibration device of the present invention is equipped with first and second drive force generating devices to drive the lens frame in a first and second direction, and first and second drive force transmission devices to transfer the drive forces of the respective drive force generating devices to the lens frame. First and second movement amount generating devices which are connected to the first and second drive force transmission devices drive the lens frame in the first or second direction, and first and second energizing devices impart energy to the lens frame in the first and second directions. The first and second movement amount generating devices comprise feed screw mechanisms and the effective diameters of the feed screws is set to be larger than the amount of movement resulting from feeding in a direction which differs from the movement direction.

The present invention thus provides first and second movement amount generating devices which are linked to the lens frame near the link of the other movement amount generating device. Thus, the moment (angular moment) generated by the frictional force, which occurs in each movement direction due to the movement of the lens frame, can be reduced.

Moreover, in accordance with the present invention, by locating the attachment portions of a spring or other energizing device, located opposite the first and second movement amount generating devices with respect to the lens frame, at a position where they can offset the angular moment, the lens may be driven and moved in the required manner.

Furthermore, in accordance with the present invention, when the lens frame moves in one direction, the effect of the energizing force accompanying the displacement of the connecting position of the energizing device in the opposite direction can be prevented by selecting the effective diameters of the feed screws used as the movement amount generating devices to be larger than the amount of movement of the lens frame, and the effect of the moment which results from the energizing device can be prevented.

BRIEF DESCRIPTION OF THE DRAWINGS

These and other objects and advantages of the invention will become apparent and more readily appreciated from the following description of the preferred embodiments taken in conjunction with the accompanying drawings, of which:

FIG. 3(*b*) is a diagram showing movement of a spring in accordance with the preferred embodiment of the present invention.

DESCRIPTION OF THE PREFERRED EMBODIMENTS

Figure 1:
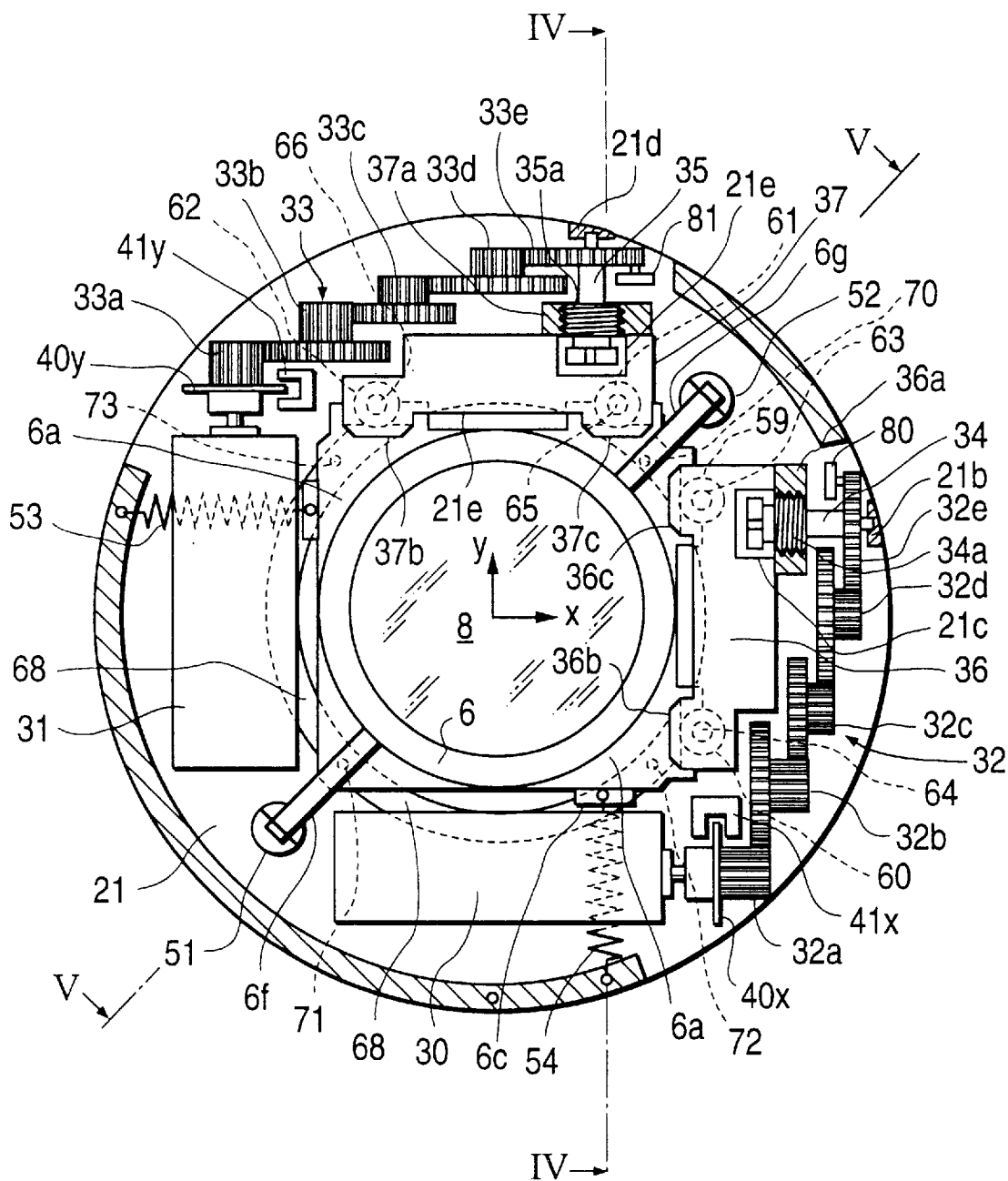
FIG. 1 is a cross-sectional view of an anti-vibration device for an optical imaging system in accordance with a preferred embodiment of the present invention.

Reference will now be made in detail to the preferred embodiments of the present invention, examples of which are illustrated in the accompanying drawings, wherein like reference numerals refer to the same or similar elements throughout.

FIGS. 1–6 show an anti-vibration device in accordance with a first preferred embodiment of the present invention. A camera having a photographic lens system fitted with a suitable lens shutter to which the present invention is applied will be described with reference to FIG. 6 which is a cross-sectional view of a camera 1.

The camera 1 includes a photographic lens system 2 ("main optical system") having an optical axis I and which is equipped with a first lens group 4, a second lens group 9 comprising front and rear lens groups 7 and 8, respectively, and a third lens group 11 which is a zoom lens.

The first lens group 4 includes three lenses 4a, 4b, 4c supported in a lens frame 3. The second lens group 9 includes lens groups 7 and 8 having a total of seven lenses. Lens group 7 includes three lenses 7a, 7b and 7c supported in a lens frame 5, and lens group 8 includes four lenses 8a, 8b, 8c and 8d supported in a lens frame 6. The third lens group 11 includes three lenses 11a, 11b and 11c, supported in a lens frame 10.

A lens shutter 12 is positioned between the front and rear lens groups 7, 8 of the second lens group 9. The lens shutter 12 includes shutter blinds 13, 14 and a drive unit 15 which drives the shutter blinds 13, 14. The drive unit 15 is positioned, for example, at the outer circumferential portion of the lens frame 5 of the front lens group 7, and the shutter blinds 13, 14 are positioned just before the rear lens group 8 which functions as an image deflection preventing lens, as described in more detail below. An image-forming plane 16, comprising a film, is positioned to form an image of a photographic subject produced by the first, second and third lens groups 4, 9, 11, respectively, which make up the photographic lens system 2.

In accordance with the preferred embodiment of the present invention, in a photographic lens system 2 having three lens groups 4, 9 and 11, as described above, the rear lens group 8 of the second lens group 9 may be shifted in a direction orthogonal to the optical axis I by an image deflection preventing unit 20 to serve as an image deflection preventing lens. By shifting the rear lens group 8, an image which is formed on the image-forming plane 16 is caused to move according to the state of image deflection.

Figure 4:
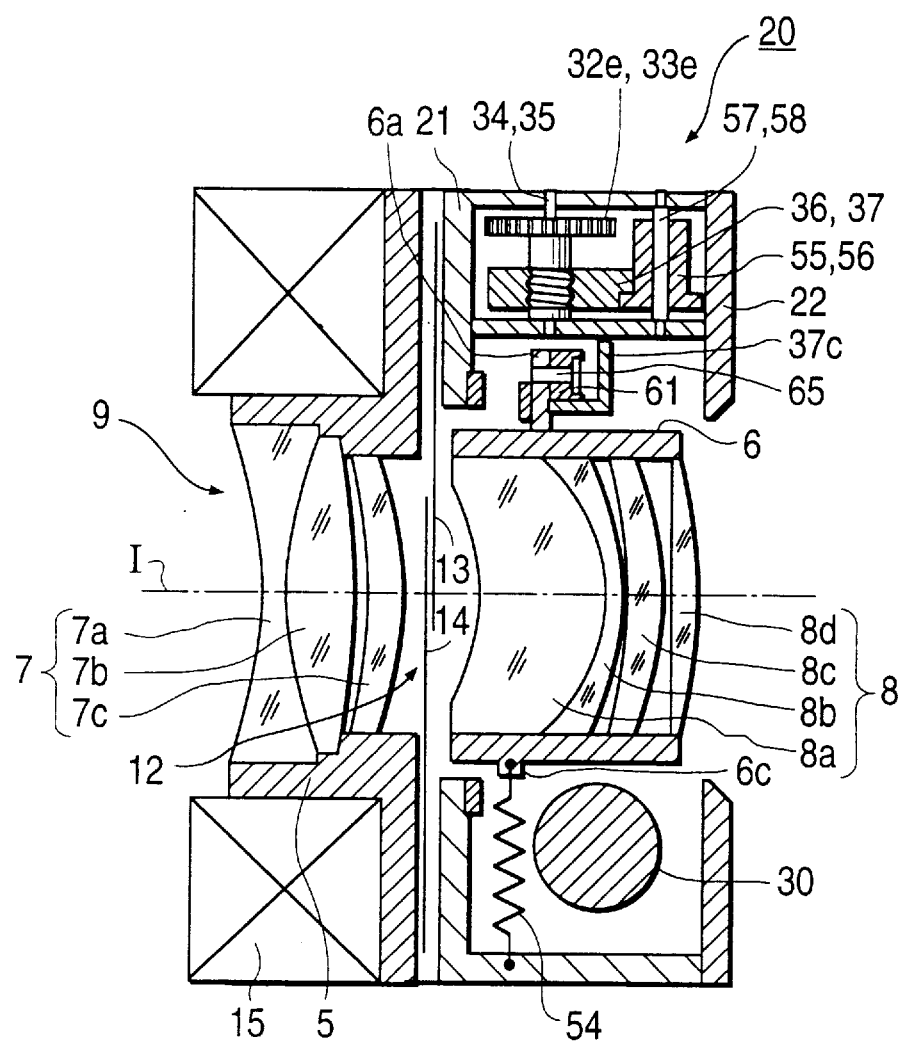
FIG. 4 is a cross-sectional view along a line IV—IV shown in FIG. 1.
Figure 5:
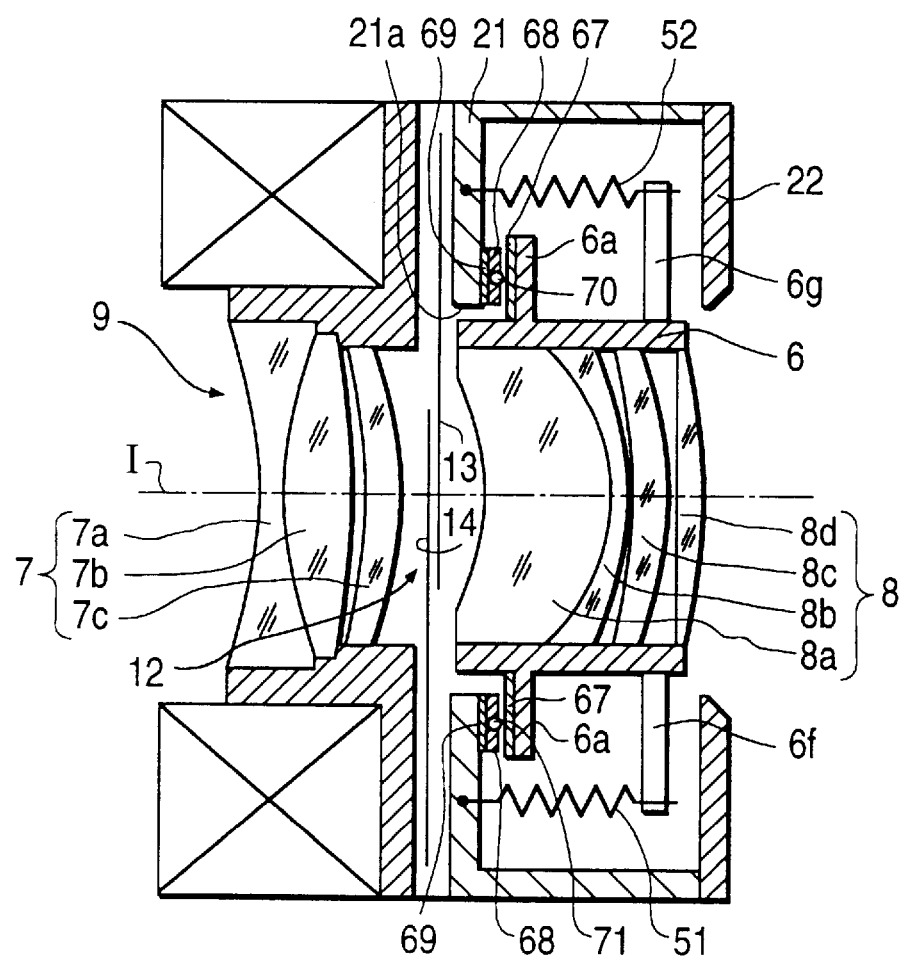
FIG. 5 is a cross-sectional view along a line V—V shown in FIG. 1.

The image deflection preventing unit 20 in accordance with the preferred embodiment will now be described with reference to FIGS. 1, 4 and 5. As is shown in FIGS. 1, 4 and 5, the image deflection preventing mechanism 20 is disposed adjacent to a base plate 21, and is arranged near the lens shutter 12 in a space on the outer circumferential side of the rear lens group 8 of the second lens group 9. Further, the rear lens group 8 of the second lens group 9 (referred to below as an anti-vibration lens) is supported by and fixed in the lens frame 6, as shown in FIGS. 1, 4 and 5.

A flange 6a is disposed facing an open aperture 21a of the base plate 21 at the outer circumferential portion of the lens frame 6. As shown in FIGS. 1 and 5, facing portions of the flange 6a and base plate open aperture 21a include receiving members 67 and 69 which may be hardened steel or similar high hardness materials. The receiving members 67, 69 receive balls 70, 71, 72 and 73 which are freely supported to revolve in fixed positions by through holes of a retainer portion 68. More specifically, the through holes within which the balls 70, 71, 72 and 73 are freely supported to revolve are formed equally distributed in the circumferential direction. The balls 70, 71, 72 and 73 are supported by and interposed between the receiving members 67 and 69 and flange 6a. The balls 70–73 are in a state in which movement of the lens frame 6 is possible with respect to the open aperture 21a of the base plate 21. Although only two of the balls, 70 and 71, are shown in FIG. 5, FIG. 1 shows the four fixed positions of balls 70–73 around the open aperture 21a between base plate 21 and the flange portion 6a.

Springs 51 and 52 (FIG. 5) are attached to the base plate 21 and to outer circumferential portions of arm members 6f and 6g of the lens frame 6. The springs 51 and 52 urge the receiving members 67 and 69 to contact the balls 70–73.

According to the structure described above, because the anti-vibration lens 8 is movably supported at low load in a plane orthogonal to the optical axis I, and is also urged by the springs 51, 52, the problem of breakdown occurring and optical performance deteriorating does not occur.

As seen in FIG. 1, DC motors 30, 31 drive the anti-vibration lens 8, moving the anti-vibrating lens 8 in the x-axis direction and the y-axis direction, respectively. DC motors 30 and 31 are mounted to the side of the base plate 21. Gear trains 32, 33 are reduction gear trains which transmit the driving force of motors 30 and 31, respectively. Gear train 32 includes transmission gears 32a, 32b, 32c, 32d and 32e and transmits the driving force of motor 30 to a first shaft 34. Gear train 33 includes transmission gears 33a, 33b, 33c, 33d and 33e and transmits the driving force of motor 31 to a second shaft 35. The first shaft 34 extends in the x-axis direction, and the second shaft 35 extends in the y-axis direction. The first shaft 34 is rotatably supported by shaft receiving portions 21b and 21c, and the second shaft 35 is rotatably supported by shaft receiving portions 21d and 21e which are arranged in the base plate 21.

The gears 32b, 32c, 32d transmit the rotation from motor 30 to shaft 34, and the gears 33b, 33c and 33d transmit the rotation from the motor 31 to the shaft 35, and each set of gears is respectively rotatably fixed to the base plate 21. Gears 32e and 33e are configured so that they rotate integrally with shafts 34 and 35 respectively.

An x-axis side moving member 36, and a y-axis side moving member 37 are moved in the x-axis direction and y-axis direction by motors 30 and 31, respectively, to transmit movement from the motors 30 and 31 to the lens frame 6. More specifically, externally threaded portions 34a and 35a of the shafts 34 and 35, respectively, are disposed to engage with internally threaded portions 36a and 37a, respectively, of moving members 36 and 37. Together the externally threaded portions 34a and 35a and the internally threaded portions 36a and 37a, respectively, comprise a feed screw mechanism. The lens frame 6 is moved in the x-axis direction and the y-axis direction via the moving members 36 and 37, respectively, according to the amount of movement imparted to the moving members 36 and 37 by the feed screw mechanisms.

Guide members 55 and 56 (FIG. 4) are attached to the moving members 36 and 37, respectively, next to the internally threaded portions 36a and 37a. As seen in FIGS. 1 and 4, the guide members 55 and 56 are guided by shafts 57 and 58, respectively. Guide shaft 57 is disposed parallel to the first shaft 34 by shaft receiving portions 21b and 21d of the base plate 21. Guide shaft 58 is secured in parallel with the second shaft 35 by shaft receiving portions 21c and 21e of the base plate 21. The above-described structure allows moving members 36 and 37 to be moved in the x-axis direction and the y-axis direction by motors 30 and 31, respectively.

As seen in FIGS. 1 and 4, rollers 59, 60, 61 and 62 are freely rotatably received by roller shafts 63, 64, 65 and 66, respectively, in the flange portion 6a of the lens frame 6. A spring 53 is attached to the lens frame 6 opposite rollers 59 and 60 between the base plate 21 and a spring suspension portion 6b. Similarly, a spring 54 is attached to the lens frame 6 opposite rollers 61 and 62 between the base plate 21 and a spring suspension portion 6c. The springs 53 and 54 are situated in directions which are approximately the same as the x-axis direction and the y-axis direction, respectively, and which are the directions of motion of the respective moving members 36 and 37.

The moving member 36 includes abutments 36b and 36c, and the moving member 37 includes abutments 37b and 37c.

The rollers 59 and 60 are placed in contact with the abutments 36c and 36b, respectively, by the urging force of spring 53. The rollers 61 and 62 are placed in contact with the abutments 37b and 37c, respectively, by the urging force of spring 54. The abutments have an L-shaped cross section at the front ends of moving members 36 and 37.

Accordingly, the above-described structure allows the anti-vibration lens 8 to be shifted in the direction in which the moving member 36 moves (x-axis direction) by motor 30, but to be free in the y-axis direction. In the same manner, the anti-vibration lens 8 may be shifted in the direction of motion of the moving member 37 (y-axis direction) by motor 31, but is free in the x-axis direction. The above-described mechanism for driving the anti-vibration lens 8 makes it possible to shift the anti-vibration lens 8 in all directions in the interior of the open aperture 21a of the base plate 21. Furthermore, by urging the lens frame 6 with the springs 53 and 54 in approximately the same direction in which the moving members 36 and 37 can move (i.e., approximately the same direction as the x-axis direction and the y-axis direction, respectively) the lens frame 6 and the moving members 36 and 37, respectively, are normally in an abutted state (i.e., are normally always in contact) and thereby the motion of moving members 36 and 37 can be accurately transmitted to the lens frame 6.

Furthermore, through the urging force of the springs 53 and 54, play in the thrust direction of the shafts 34 and 35 can be eliminated. Additionally, play in the engagement portions of the internally threaded portions 34a and 35a of the shafts 34 and 35, respectively, and the internally threaded portions 36a and 37a of the moving members 36 and 37, respectively, can be consistently eliminated in the respective urging directions of the springs 53 and 54. Accordingly, the driving force of the respective motors 30, 31 can be accurately transmitted to the anti-vibration lens 8.

Figure 2:
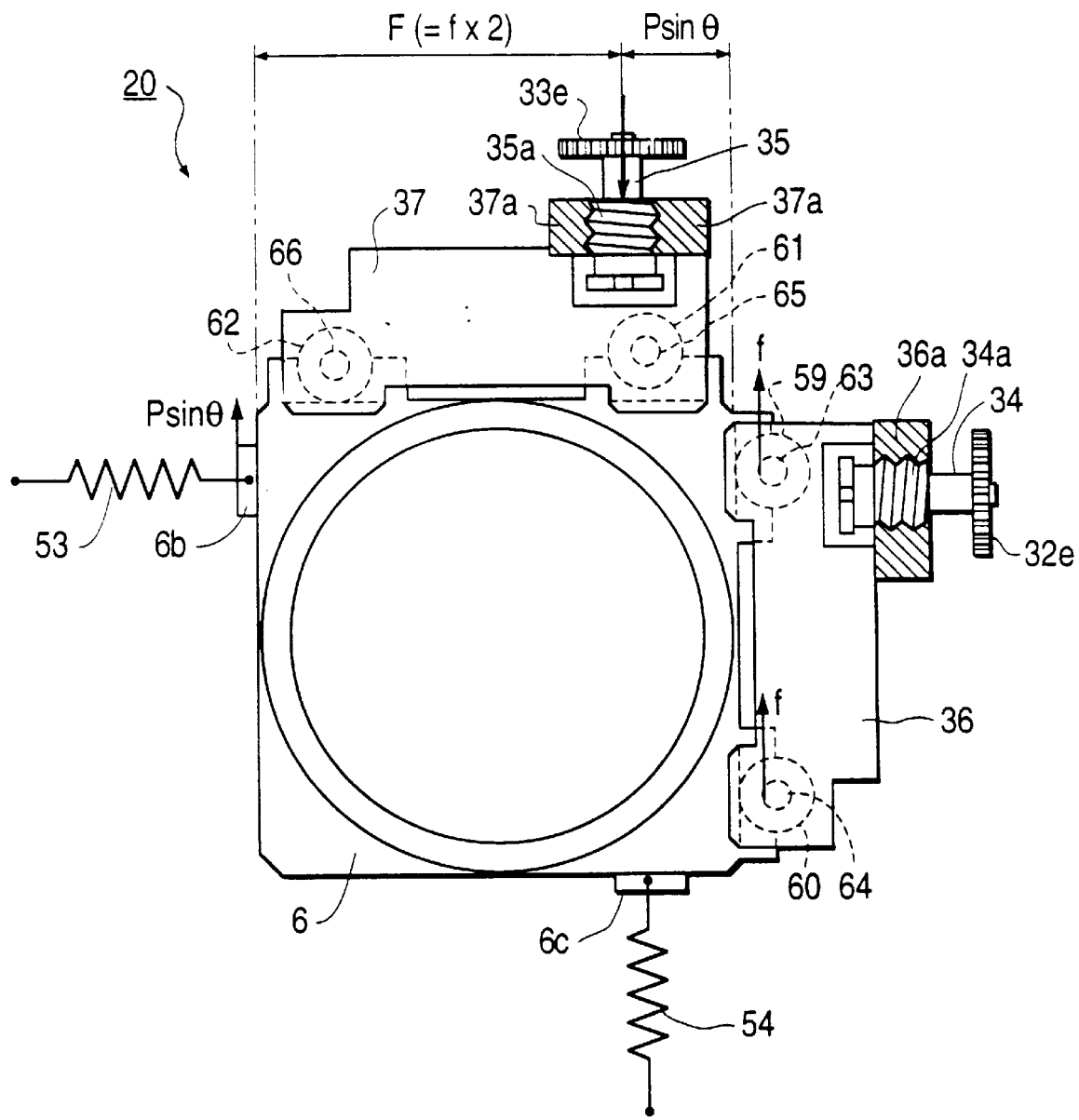
FIG. 2 is a schematic diagram showing a relationship between a lens frame and a device for imparting movement to the lens frame in accordance with the preferred embodiment of the present invention.
Figure 3A:
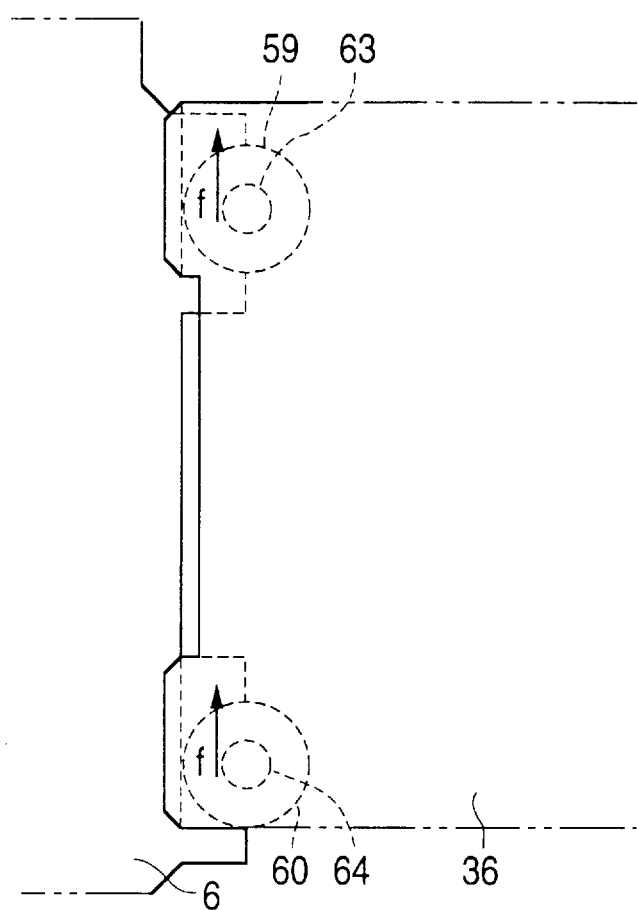
FIG. 3(*a*) is a plan view showing a relationship between a lens frame, a movement amount generating device, and an energizing device in accordance with the preferred embodiment of the present invention.
Figure 3B:
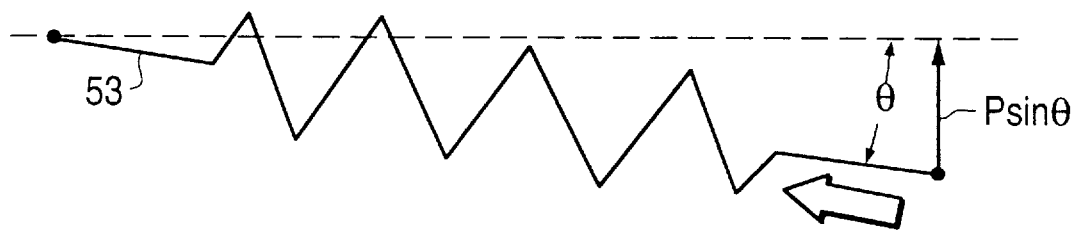

Referring now to FIG. 2 and FIGS. 3(a) and 3(b), the preferred embodiment of the present invention will be described in detail below. FIG. 2 and FIG. 3(a) and 3(b) show the assembly unit of a movement force generating device for the lens frame 6 in accordance with the present invention. As seen in FIG. 2 and FIGS. 3(a) and 3(b), in accordance with present invention, the respective contacting portions of the shaft 35, the spring 54 and the rollers 59 and 60 with the moving member 37 are aligned approximately on a straight line. Similarly, the contacting portions of shaft 34, the spring 53, and rollers 61 and 62 with the moving member 36 are also aligned approximately on a straight line. The shaft 34 and the moving member 36, are set to a position near the link between the moving member 37 and the lens frame 6. Similarly, the shaft 35 and the moving member 37 are set to a position near the link between the moving member 36 and the lens frame 6.

The shafts 34 and 35 are coupled to the moving members 36 and 37, respectively, and the moving members 36 and 37 contact the lens frame 6 to move the lens frame 6 in the x-axis direction or the y-axis direction. Additionally, the lens frame 6 is guided in the direction of movement in the y-axis direction or the x-axis direction. Furthermore, the shafts 34 and 35 are positioned such that the position of the force which acts on the lens frame 6 transmitted by respective shafts 34 and 35 is within the range of the link between the moving members 36 and 37 and the lens frame 6, and is at a position close to the position at which the adjacent moving member is linked to the lens frame 6.

By arranging the link position of the shaft 34 (or 35) and moving member 36 (or 37) with respect to the lens frame 6 at a position close to the link position of the shaft 35 (or 34) with the moving member 37 (or 36), it becomes possible to reduce the effects of the angular moment which is generated through the frictional forces caused by the movement of the lens frame 6.

For example, the shaft 35 which is driven in the y-axis direction imparts movement to the moving member 37 by the externally threaded portion 35a of shaft 35 and the internally threaded portion 37a of the moving member 37, via the spring 54. A rolling frictional force (f), the size which corresponds to the movement amount, is generated in the direction of the arrows f in FIG. 2 and FIG. 3(a) between the lens frame 6 and the x-axis movable member 36.

As seen in FIGS. 2 and 3(a), the rolling frictional force (f) rotates and drives the y-axis shaft 35, for example, and is generated between the lens frame 6 and the movable member 37 when the lens fame 6 is moved in the direction of the arrow in the figures by the feed screw mechanism 35a, 37a moving member 37 and spring 54. (f here is the rolling frictional force generated at a slidable surface section between the shaft holes of rollers 59 and 60 and the circumference section of roller shafts 63 and 64).

On the other hand, at the connecting position of spring 53 to the lens frame 6, as is clear from FIGS. 2 and 3(b), a force which is indicated in the figures by $P \sin \theta$ is generated with respect to a displaced angle $\theta$, where P is the energizing force from spring 53. This force is the result of the spring 53 connecting position being displaced according to the amount of movement of the lens frame 6.

When the above-described types of acting force relationships occur, the following problems may result in conventional systems. Specifically, as seen in FIG. 2, the force generated on both the left and right sides of the lens frame 6 has the relation, "$f+f > P \sin \theta$". This relationship may occur, for example, when the position of linkage to the lens frame 6 via moving member 37 of x-axis shaft 35 is positioned in the center of the direction of the width of y-axis moving member 36. As a result, an inability to perform the required movement control of the anti-vibration lens 8 occurs.

In contrast, according to the preferred embodiment of the present invention, the position of connection to the lens fame 6 via moving member 37 of the y-axis shaft 35 is brought near the slidable section of the moving member 36 and the lens frame 6. The angular moment which acts on the lens frame 6 is thereby reduced. Particularly, as shown in FIGS. 2 and 3(a), the rolling frictional force (f) approximately conforms to the extended line of the force in the y-axis direction, which moving member 37 receives from y-axis shaft 35 and spring 54. As a result, the rolling frictional force (f) can be reduced and the movement of the lens frame 6 becomes smooth.

The acting position of the force on the y-axis side is obtained as follows. Specifically, the position of the force which offsets the angular moment acting on the lens frame 6, and which is generated by the loads in the respective directions which are generated at the link between the lens frame 6 and the x-axis moving member 36 and by the loads in the respective directions from x-axis spring 53, is a position which divides the length of one side of the lens frame 6 by a specified ratio.

A position which offsets the angular moment is the position of the shaft 35, as shown in FIG. 2. For example, the arrangement resulting from this ratio satisfies the relationship:

$$F (=f \times 2):P \sin \theta$$

where the rolling frictional force between a roller 59 or 60 and a roller shaft 63 or 64, respectively, when the anti-vibration lens 8 has been moved is (f), the incline of a spring 53 or 54 which is arranged in a direction which is perpendicular to the motion direction is θ, and the energizing force which is applied to the spring is P.

By arranging the shafts 34, 35 in the above-described manner, the rolling frictional force (f) generated when the lens frame 6 is moved by a drive force, and the force in the direction of the movement, which results from the change in the energizing force of spring 53, are offset. Accordingly, the generation of an angular moment on the lens frame 6 is prevented.

Although the above has been described with respect to the x-axis shaft 34, the operation and positioning of the shaft 35 is similar to that of the x-axis side through the shaft 34, moving member 36 and spring 53, which are arranged in a direction perpendicular to the shaft 35.

Now, two examples will be given in which the angle θ is an angle which results from the amount of movement of the lens frame 6 through the y-axis moving member 37. In the first example, a desired range position is selected from within a range between 0 and the maximum movement position (MAX), at which movement is mechanically restricted by a mechanical control means (not shown) on the lens barrel. According to the second example, the described range position is selected to be ½ the value of MAX (considered as the most frequently used position). Either of the two values may be selected.

For example, when the tensile force of the spring 53 is 20 g, and the coefficient of friction between the roller shafts 63 and 64 of the rollers 59 and 60, respectively, is 0.3, and movement of 1 mm from the optical axis has been caused:

$$P \cdot \sin\theta : 2f = \text{approximately } 1:7$$

The connecting positions of shafts 34 and 35 may be set according to the above ratio.

Furthermore, rotation limiting members 80 and 81 (FIG. 1) constitute mechanical limiting means and are arranged, for example, as an attachment to gears 32e and 33e, respectively, axially supported on shafts 34 and 35. The rotation limiting members 80 and 81 limit the range of movement of the lens frame 6 which supports the anti-vibration lens 8 by the combination of a protruding portion and a grooved portion (not shown in detail in the figure).

The position and speed of the anti-vibration lens 8 are detected with perforated disks 40x and 40y (FIG. 1) having numerous perforations arranged at intervals in the peripheral portion of the disks. The disks 40x and 40y are arranged integrally with the gears 32a and 33a, respectively. Photo-interruptors 41x and 41y are arranged on the base plate 21 with the peripheral portions of the disks 40x and 40y respectively arranged between the photointerruptors. The respective photointerruptors detect the number of perforations on the side of the disks 40x and 40y as pulse signals, and by counting the pulse signals the movement of the motors 30 and 31 and the position and speed of the anti-vibration lens 8 are detected.

The image deflection preventing unit 20 having the above-described construction prevents image deflection by shifting the anti-vibration lens 8 in a direction orthogonal to the lens optical axis I. The image formed in the imaging plane 16 is thereby moved in a required state, and as a result the deflection of the image is prevented.

In accordance with the preferred embodiment of the present invention, the above-described image deflection preventing unit 20 makes it possible to locate the DC motors 30 and 31, which are of comparatively large volume, with their length direction in a positional relationship transverse with respect to the optical axis I of the lens group 2. Further, as is also clear from FIGS. 4 and 5, it is not necessary for the DC motors 30 and 31 to protrude in the vicinity of the lens shutter 12 or the third lens group 11. A high density and compact unitized assembly is possible on the outer circumferential side of the lens frame 6, which is advantageous from the aspect of structure and assembly.

Accordingly, the above-described image deflection preventing unit 20 efficiently utilizes the space of the lens shutter 12, and the space between the second lens group 9 and the third lens group 11. Moreover, because the unitization, as above-described, can be simply performed, it is easily incorporated into camera design, and, for example, even if located adjacent to the aperture mechanism in an interchangeable photographic lens it is very advantageous.

The first and second motors 30 and 31 are in an annular space portion formed at the outer circumferential portion of the lens frame 6, and the first and second moving members 36 and 37 are movably located within this space in a position displaced towards the circumference. Because the respective length directions are located in a positional relationship such that they are transverse of the optical axis I, in spite of a simple mechanism structure, the DC motors 30 and 31 can be located without protruding externally, and also by means of these the image preventing deflection unit 20 can constitute a unitized structure, and the space saving and cost saving design of the unit 20 is advantageous.

The above-described advantages are also manifested in that the output shafts of the motors 30 and 31 are respectively located toward the x-axis direction and the y-axis direction such that their rotation force, via gear trains 32 and 33, first and second shafts 34 and 35, and first and second movable members 36 and 37, is converted into rectilinear motion in the respective x-axis direction and y-axis direction.

Figure 6:
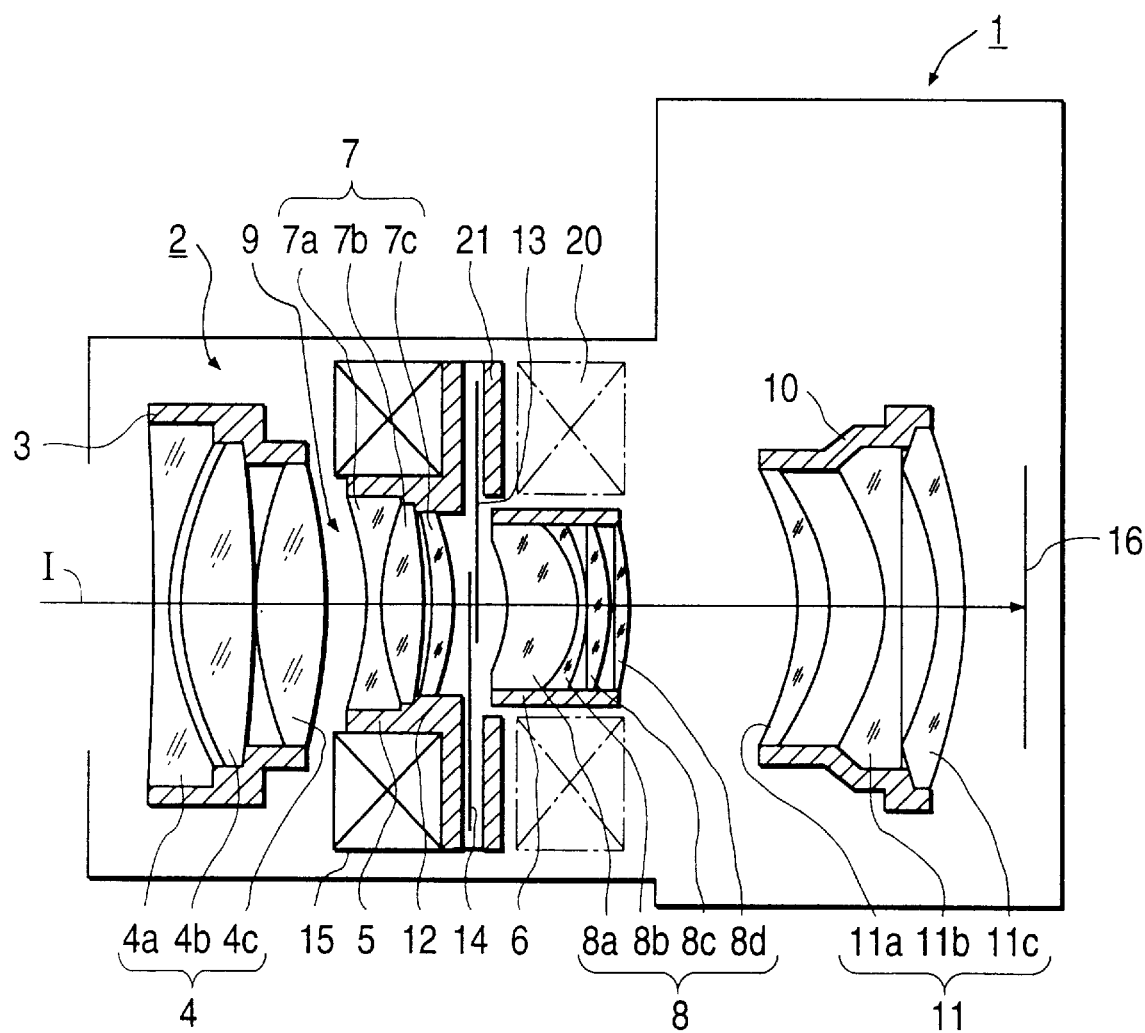
FIG. 6 is a cross-sectional view showing a camera having a suitable lens shutter to which the anti-vibration device of the preferred embodiment of the present invention is applied.

Furthermore, in accordance with the above-described preferred embodiment, the image deflection preventing unit 20 is unitized in an annular space formed at the external circumference of the lens frame 6 of the anti-vibration lens 8 using a case member consisting of the base plate 21 and a cover body 22. Further, the size of the image deflection preventing unit 20 is small and thereby other complicated mechanisms, e.g., the lens shutter 12, shown in FIG. 6, are located in regions which are adjacent.

Figure 7:
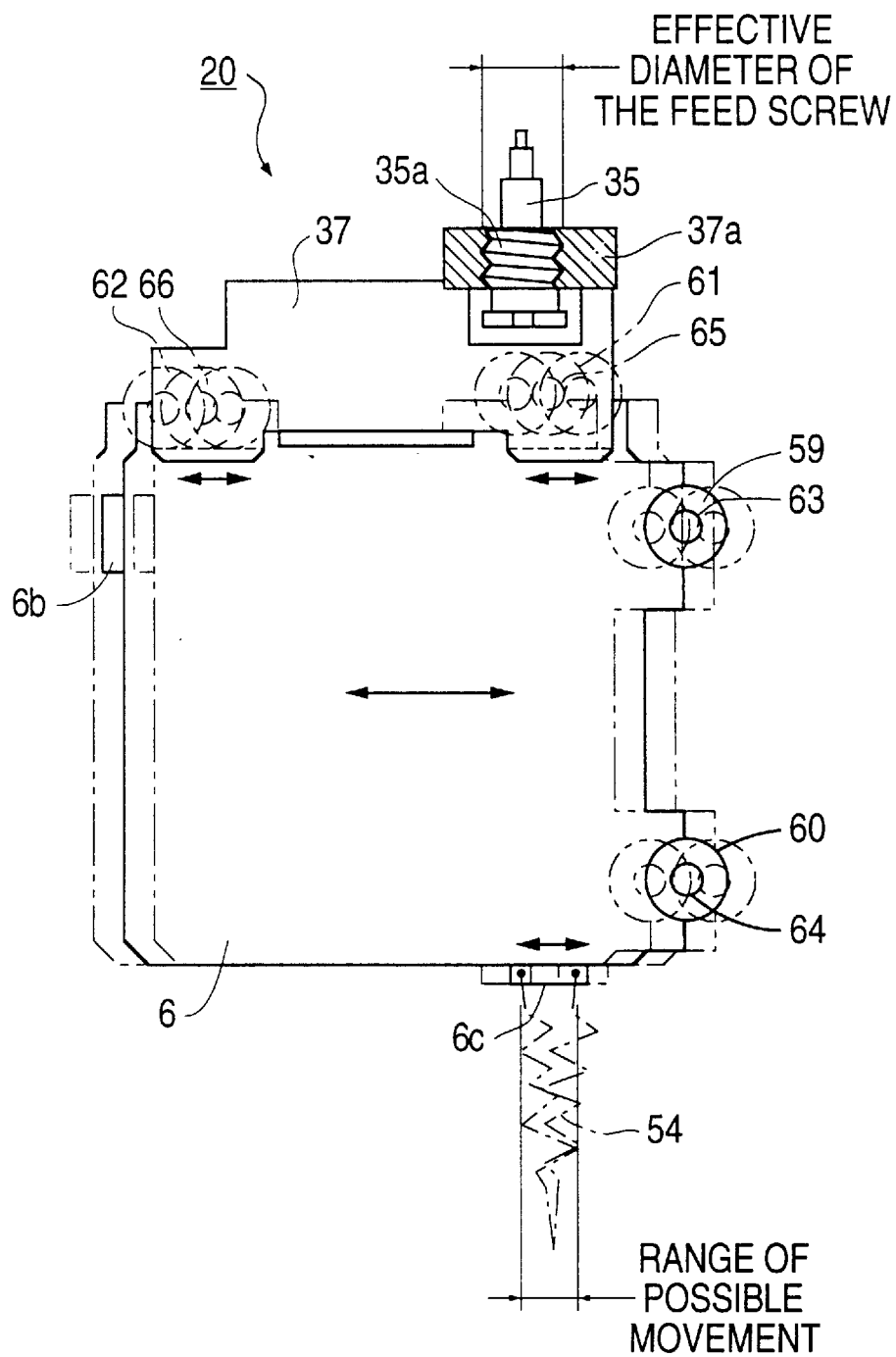
FIG. 7 is a schematic diagram illustrating a vibration prevention device in accordance with a second embodiment of the present invention.

FIG. 7 shows an anti-vibration device as used for an optical imaging system in accordance with a second embodiment of the present invention. The same or corresponding parts are referred to by like reference numerals, and a detailed description of like parts is omitted.

As seen in FIG. 7, movement is generated by a feed screw mechanism comprising an externally threaded portion 35a and an internally threaded portion 37a (34a and 36a also comprise a feed screw mechanism). The effective diameter of the feed screw mechanism is set greater than the range of motion in a direction which is different from the direction of movement which results from the feeding. As described above, the range of movement of the lens frame 6 is limited by the rotation limiting members 80 and 81, and the effective diameters of the feed screws may be suitably set to correspond to the range of movement.

When the lens frame 6 moves in one direction, the connecting position of a spring 53 or 54 is displaced with the effect of a moment acting on the feed screws in the direction of movement of the energizing force of the spring 53 or 54. This is because the effective diameter of the feed screw used to generate movement is set to be larger than the amount of movement of the lens frame 6. Therefore, the effect of the moment acting on the feed screws which is caused by the springs 53 and 54 is prevented, and accurate drive control of the anti-vibration lens 8 is possible.

More specifically, with the above-described type of configuration, when the lens frame 6 is moving in one direction, the effect of the energizing force which results from the displacement of the connection position of the spring in the other direction can be appropriately and reliably prevented. Also, through the above-described type of movement amount generating device, which is based on a feed screw, there is no danger of a sticking problem being caused by partial wear at the connection positions of springs 53 and 54 to the frame 6.

It will be recognized that the present invention is not limited to the above-described embodiments and the structure and configuration of the image deflection preventing unit 20 comprising the anti-vibration device may be suitably modified and altered.

Further, in accordance with the above-described embodiments an application of the present invention has been described with respect to a camera having a lens shutter 12. However, the invention is not limited to a camera using a lens shutter, and may be applied to a vibration prevention lens of any camera or other imaging device in which image deflection due to hand tremor or other cause of vibration may be prevented by shifting an anti-vibration lens in a direction orthogonal to the optical axis I.

Furthermore, the application of the anti-vibration device according to the present invention is not limited to cameras and the anti-vibration device may be applied to various kinds of optical imaging instruments, photographic equipment, and the like.

Although preferred embodiments of the invention have been shown and described, it will be appreciated by those skilled in the art that changes may be made in these embodiments without departing from the principles and spirit of the invention, the scope of which is defined in the appended claims and their equivalents.

What is claimed is:

1. An anti-vibration device for an optical system, comprising:

an anti-vibration optical system;

a lens frame movably supporting the anti-vibration optical system; and a drive device to drive the anti-vibration optical system, the drive device including, a first drive shaft positioned adjacent a first side of the lens frame to provide a drive force to the first side of the lens frame at a first position, a first spring connected to a side of the lens frame opposite the first side of the lens frame and imparting a force on the lens frame;

a second drive shaft positioned adjacent a second side of the lens frame to provide a drive force to a second side of the lens frame at the second position, and a second spring connected to a side of the lens frame opposite the second side of the lens frame and imparting a force on the lens frame, wherein the first position and the second position are positions which are off-center with respect to the first side and second side of the lens frame, respectively, and divide the first side of the lens frame and the second side of the lens frame, respectively, in a ratio defined by F:P sin θ, where F is a frictional force resulting when the anti-vibration optical system is moved, P is an energizing force applied to the first and second springs, and Θ is an angle of one of the first and second springs which is perpendicular to a motion direction of the anti-vibration optical system.

2. An anti-vibration device as recited in claim 1, wherein the first and second drive shafts provide respective drive forces to adjacent sides of the lens frame.

3. An anti-vibration device as recited in claim 1, wherein the specified ratio is approximately 1:7.

4. An anti-vibration device as recited in claim 1, wherein the drive device further comprises:

a first moving member connected to the first drive shaft and contacting the lens frame to transmit the force of the first drive shaft to the lens frame;

a second moving member connected to the second drive shaft and contacting the lens frame to transmit the force of the second drive shaft to the lens frame; and wherein the first drive shaft provides a drive force to the lens frame in a first direction at a position which is approximately on line with a position of contact between the second moving member and the lens frame, and the second drive shaft provides a drive force to the lens frame in a second direction at a position which is approximately on line with a position of contact between the first moving member and the lens frame.

5. An anti-vibration device as recited in claim 1, wherein the drive device further comprises:

a first moving member connected to the first drive shaft and contacting the lens frame;

a second moving member connected to the second drive shaft and contacting the lens frame;

wherein the first spring, the first drive shaft and the position at which the second moving member contacts the lens frame are aligned in approximately a straight line, and the second spring, the second drive shaft and the position at which the first moving member contacts the lens frame are aligned in approximately a straight line.

6. An anti-vibration device as recited in claim 5, wherein the first drive shaft and the second drive shaft are connected to the first and second moving member, respectively, at a position which is off-center with respect to the moving member.

7. An anti-vibration device as recited in claim 5, wherein the position of a force acting on the lens frame by the first drive shaft is a position offsetting an angular moment acting on the lens frame and which is generated between the second moving member and the lens frame, and wherein the position of a force acting on the lens frame by the second drive shaft is a position offsetting an angular moment acting on the lens frame and which is generated between the first moving member and the lens frame.

8. An anti-vibration device for an optical system, comprising:

an anti-vibration optical system having an optical axis;

a lens frame supporting the anti-vibration optical system;

a first drive force generating device contacting a first side of the lens frame to impart a movement force to the lens frame in a first direction;

a first energizing device connected to a side of the lens frame opposite the first side of the lens frame and imparting a force to the lens frame;

a second drive force generating device contacting a second side of the lens frame to impart a movement force to the lens frame in a second direction; and a second energizing device connected to a side of the lens frame opposite the second side of the lens frame and imparting a force to the lens frame, wherein the first drive force generating device imparts the movement force to the lens frame in the first direction approximately in line with a position at which the second drive force generating device contacts the lens frame and a direction in which the first energizing device is aligned, and the second drive force generating device imparts the movement force to the lens frame in the second direction approximately in line with a position at which the first drive force generating device contacts the lens frame and a direction in which second energizing device is aligned.

9. An anti-vibration device as recited in claim 8, wherein the respective positions at which the first drive force generating device imparts a movement force to the lens frame and the second drive force generating device imparts a movement force to the lens frame divide respective sides of the lens frame in a specified ratio.

10. An anti-vibration device for an optical system, comprising:

an anti-vibration optical system having an optical axis;

a lens frame movable in a plane approximately perpendicular to the optical axis of the anti-vibration optical system;

a first drive force generating device to drive the lens frame in a first direction, including
a first drive motor,
a first drive shaft connected to the first drive motor,
a first moving member connected to the first drive shaft and contacting a first side of the lens frame to move the lens frame in the first direction; and
a first spring connected to a side of the lens frame opposite the first side of the lens frame and imparting a force on the lens frame;

a second drive force generating device to drive the lens frame in a second direction different from the first direction, including
a second drive motor,
a second drive shaft connected to the drive motor,
a second moving member connected to the second drive shaft and contacting a second side of the lens frame to move the lens frame in the second direction, and
a second spring connected to a side of the lens frame opposite the second side of the lens frame and imparting a force on the lens frame, wherein the first drive shaft imparts a force to the lens frame via the first moving member at a position which is off-center with respect to the first side of the lens frame and which offsets an angular moment acting on the lens frame generated between the second moving member and the lens frame, and the second drive shaft imparts a force to the lens frame via the second moving member at a position which is off-center with respect to the second side of the lens frame and which offsets an angular moment acting on the lens frame generated between the first moving member and the lens frame.

* * * * *